Figure 5:
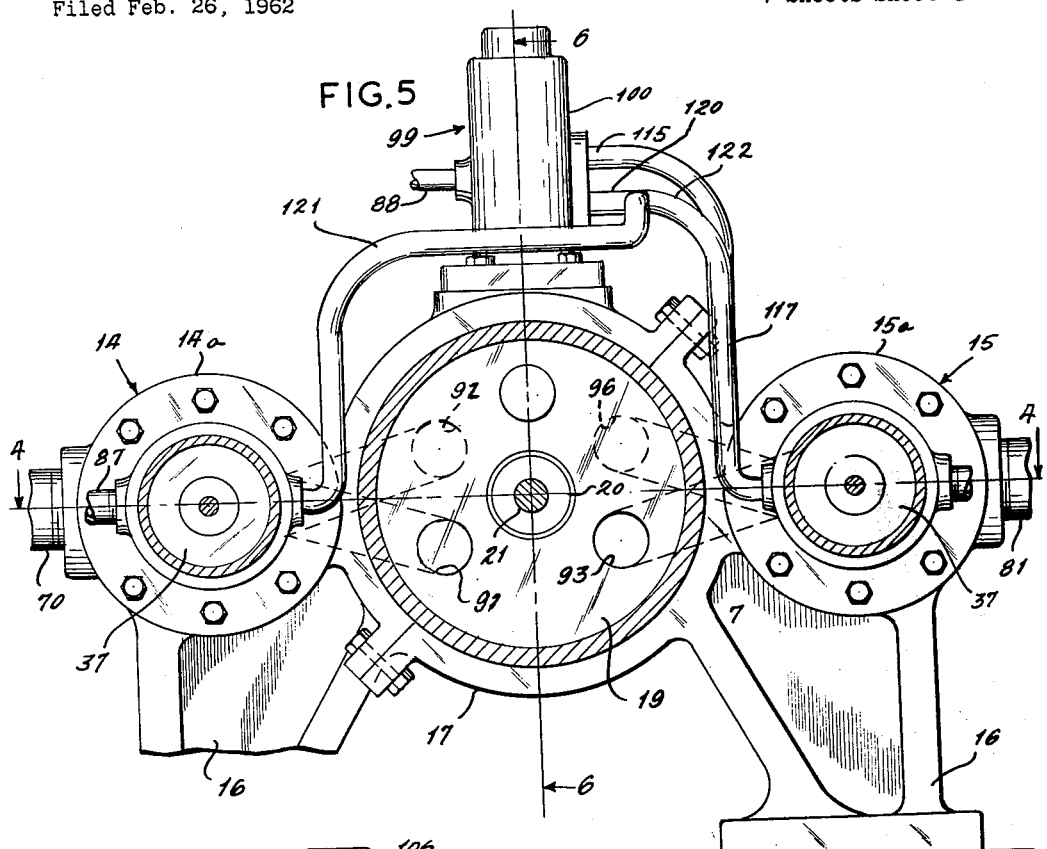

Dec. 22, 1964 J. E. SMITH 3,162,133
HYDRAULIC POWER CONVERTER
Filed Feb. 26, 1962 7 Sheets-Sheet 1
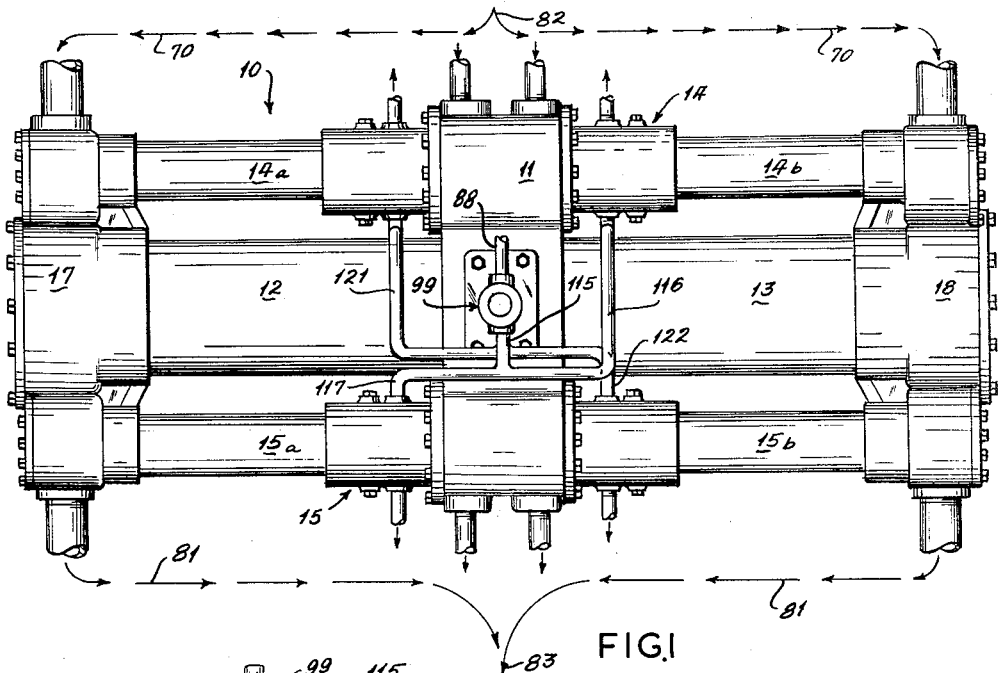
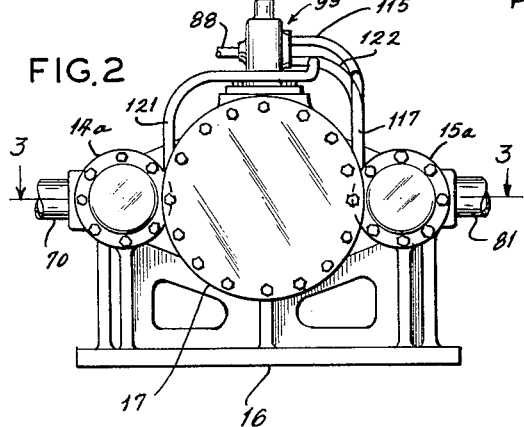
INVENTOR:
JAMES E. SMITH
BY Gravely, Lieder & Woodruff
ATTORNEYS.

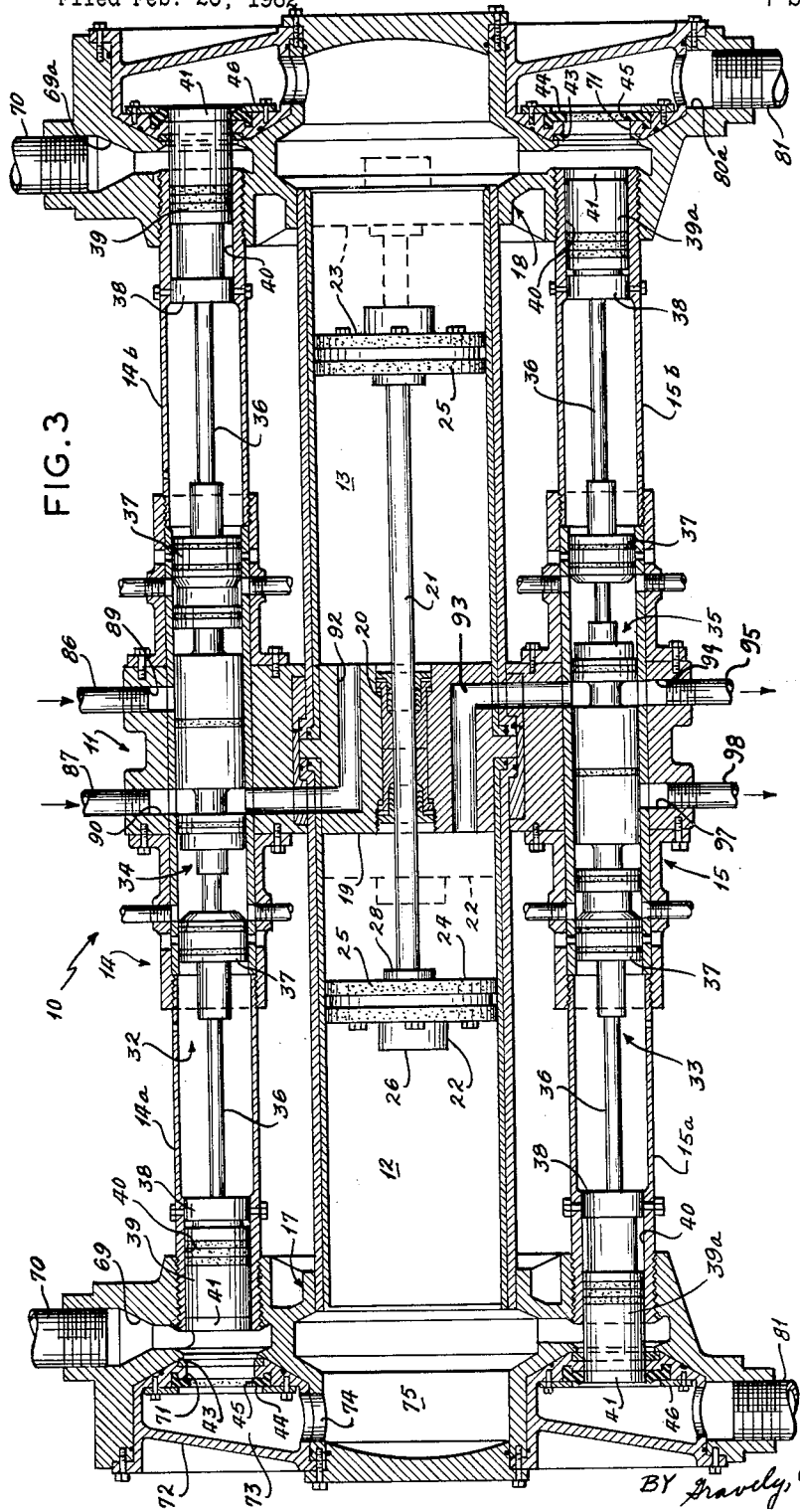

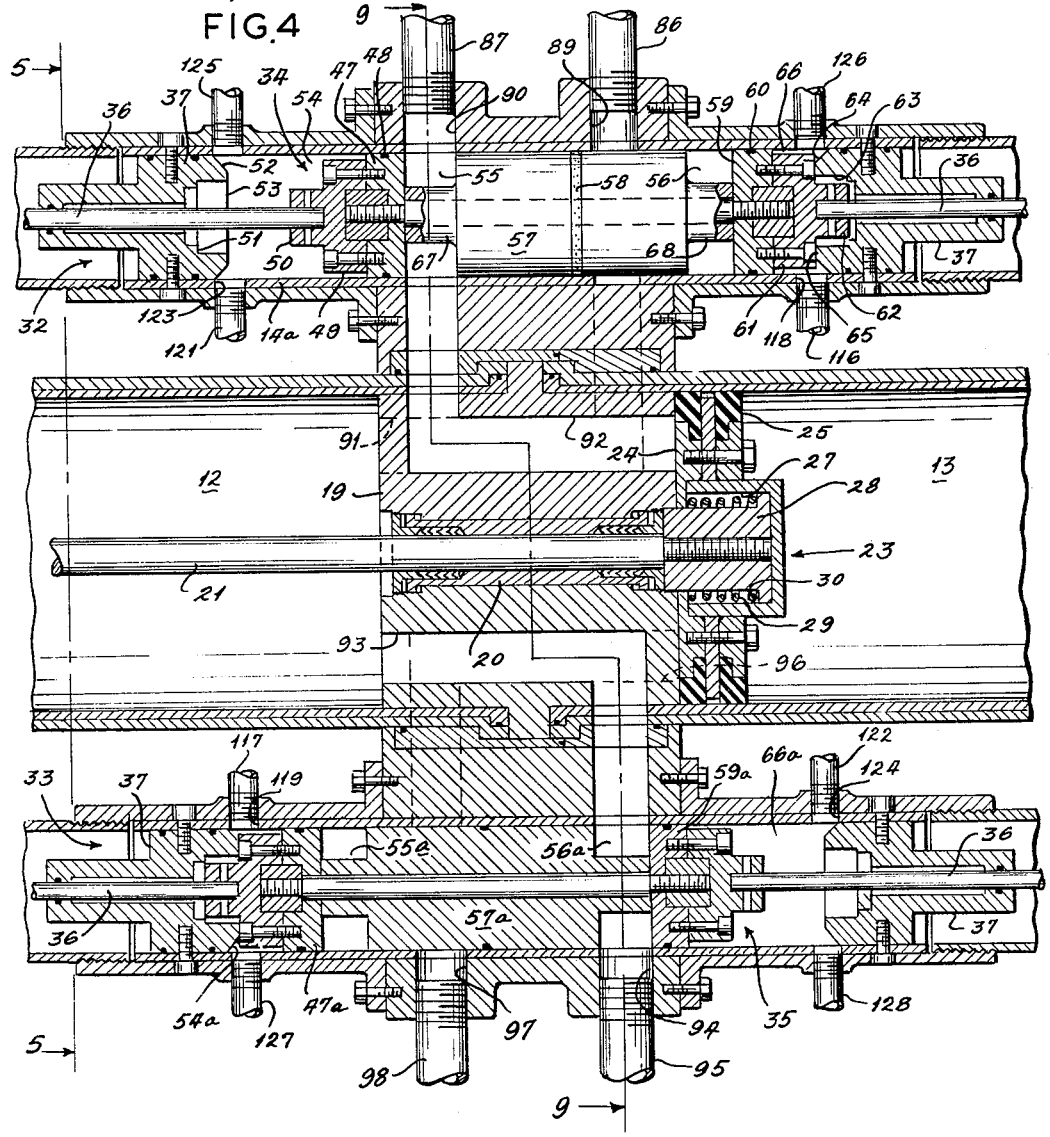

Dec. 22, 1964    J. E. SMITH    3,162,133
HYDRAULIC POWER CONVERTER
Filed Feb. 26, 1962    7 Sheets-Sheet 4

INVENTOR:
JAMES E. SMITH
BY Gravely, Lieder & Woodruff
ATTORNEYS.

Dec. 22, 1964  J. E. SMITH  3,162,133
HYDRAULIC POWER CONVERTER
Filed Feb. 26, 1962  7 Sheets-Sheet 5

INVENTOR:
JAMES E. SMITH
BY Gravely, Lieder & Woodruff
ATTORNEYS

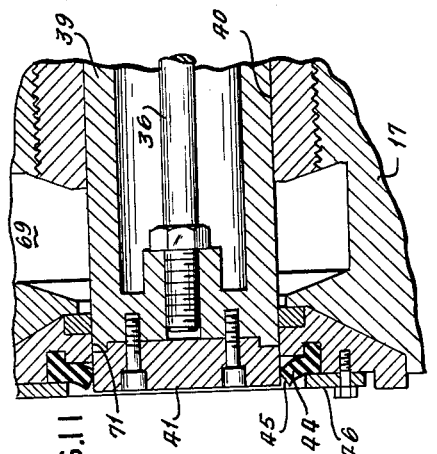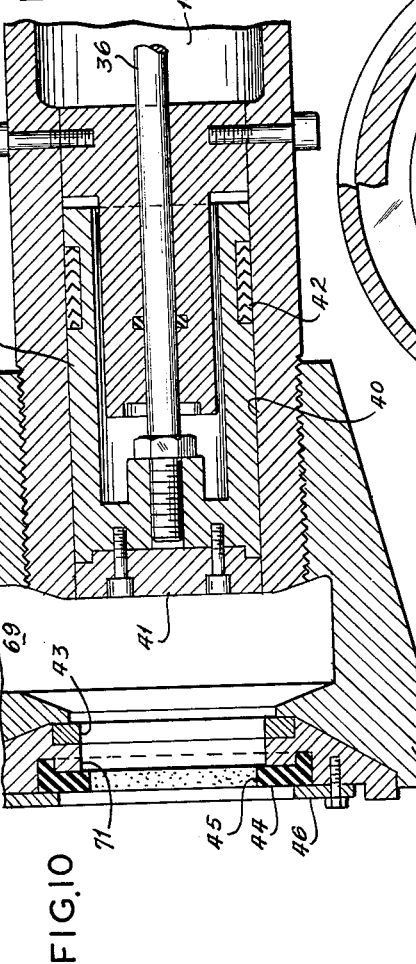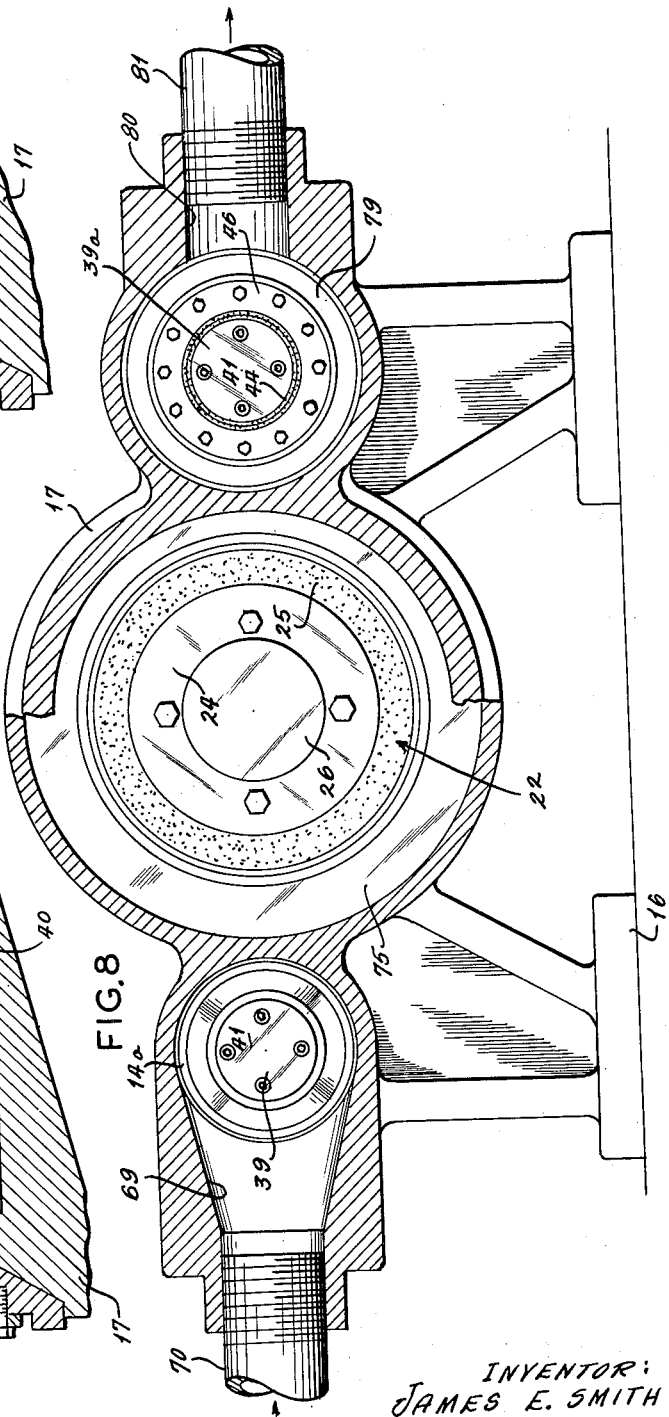

Dec. 22, 1964   J. E. SMITH   3,162,133
HYDRAULIC POWER CONVERTER
Filed Feb. 26, 1962   7 Sheets-Sheet 7

INVENTOR:
JAMES E. SMITH
BY Gravely, Lieder & Woodruff
ATTORNEYS.

United States Patent Office 3,162,133
Patented Dec. 22, 1964

3,162,133
HYDRAULIC POWER CONVERTER
James E. Smith, 302 Plantation Drive, Lake Jackson, Tex.
Filed Feb. 26, 1962, Ser. No. 175,767
15 Claims. (Cl. 103—52)

This invention relates to a hydraulic power converter for exerting pressure on abrasive fluids so that the fluids may be transmitted through pipe lines. In particular, this invention relates to an auxiliary device for pumping large quantities of such materials as coal, iron ore, woodchips, etc. mixed with water or other liquids under high pressure so that the abrasive or lumpy material can be transported through pipes directly from deep mines or high mountains, or other places where transportation presents a problem of economics or accessibility thereby avoiding the necessity for the heavy equipment or expensive roads, trucks, trains, or other present day methods of transportation equipment, etc.

At the present time, such abrasive, or heavy, lumpy materials are pumped at limited pressure. However, for economically moving these slurries, much is to be desired in more efficient equipment, since conventional pumps wear out rapidly, especially under high pressure. For this reason, the pumping of such materials is not in widespread use.

One of the principal objects of the present invention is to provide a device which allows abrasive or solid laden fluid to be pumped without said fluid or slurry having to pass through the pump itself.

Another object is to increase the pressure on large quantities of abrasive fluids by using relatively large cylinders with slow moving pistons to reduce wear.

Another object is to provide a device for pumping said abrasive fluid through plunger valves which operate relatively infrequently, but move very fast when they are operating so as to cut or chop up any object which might tend to cause a conventional valve to stick or become jammed.

A further object is to provide a device in which there is some "play" or flexibility between a double headed piston and the central connecting shaft to prevent interruption of the continuous operating fluid from the pump, and to prevent pulsation during pumping.

Another object is to provide a hydraulic device wherein the valves operate by hydraulic power against the discharge pressure of fluid from the converter and are so constructed and arranged to hold and seal against said pressure, with the pressure being exerted through the pipe line leading from the converter. This is accomplished through the use of actuating spool valves of greater effective diameter than the opening which receives the plunger valve.

A further object is to provide an auxiliary pumping device for transmitting large quantities of abrasive material in a fluid slurry wherein fast acting plungers, acting as valves are provided with hardened cutting inserts and heads adapted to chop up and cut through any solid foreign matter which may be lodged in the path of the plunger, or piston valve.

Still another object is to provide a hydraulic power converter device operated by a pressure pump and adapted to transmit highly abrasive or solid laden fluids for long distances through a high pressure pipe line without undue wear on the pumping components powering the device.

Another object is to provide a hydraulic power converter wherein the moving main piston controls the movement of a switching valve which directs the high pressure fluid from the operating power pump to the spool valve chambers of the intake and exhaust plunger valves, which in turn change the direction of, or reverse the direction of fluid flow into the main chambers or cylinders to reciprocate the main pistons back and forth, and at the same time, reverse the positions of the plunger valves.

Still a further object of the present invention is to provide a double headed plunger valve including a center control portion adapted to alternately receive fluid under pressure in spaced expandable chambers to drive said valve along a fixed casing and to hold said valve in its seat. Another object is to provide a plunger valve as described wherein the heads and cooperating seats are constructed of hardened mating surfaces to chop through solid matter which may be lodged in the path of the moving valve head.

A further object of the present invention is to provide a piston head and rod having limited predetermined longitudinal movement therebetween. Another object is to provide a flexible piston rod and head as described wherein a resilient means is trapped between internal shoulders on the head and the end of the rod to give limited longitudinal movement between the rod and the head.

These and other objects and advantages will become apparent hereinafter.

The present hydraulic power converter comprises a relatively large cylindrical chamber for receiving pumped fluid on the inside of a piston and abrasive containing fluid on the other side, said piston head cooperating with inlet and outlet valves which move relatively infrequently but very rapidly, said valves being provided with heads of hard material which pass through a ring of like material so as to chop through any abrasive or solid material which might tend to clog the valve, or plunger opening, said main piston heads being secured to a central shaft with flexible play provided therebetween to prevent pulsation or interruption of total flow from the operating pump.

The invention also consists in the parts and in the arrangements and combinations of parts hereinafter described and claimed.

Figure 6:
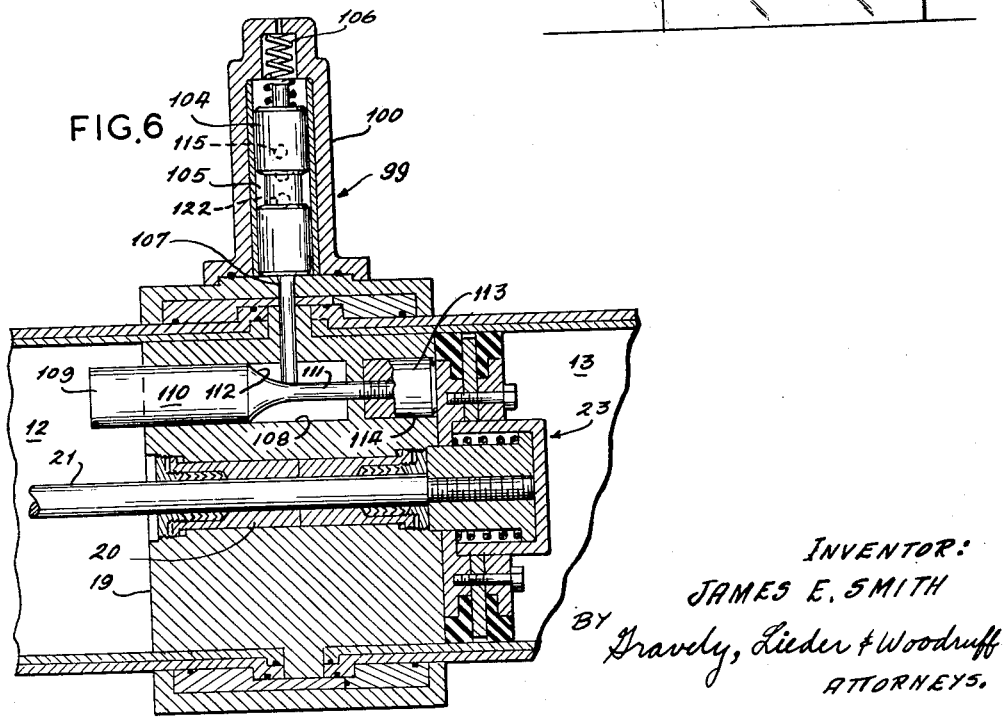
Figure 7:
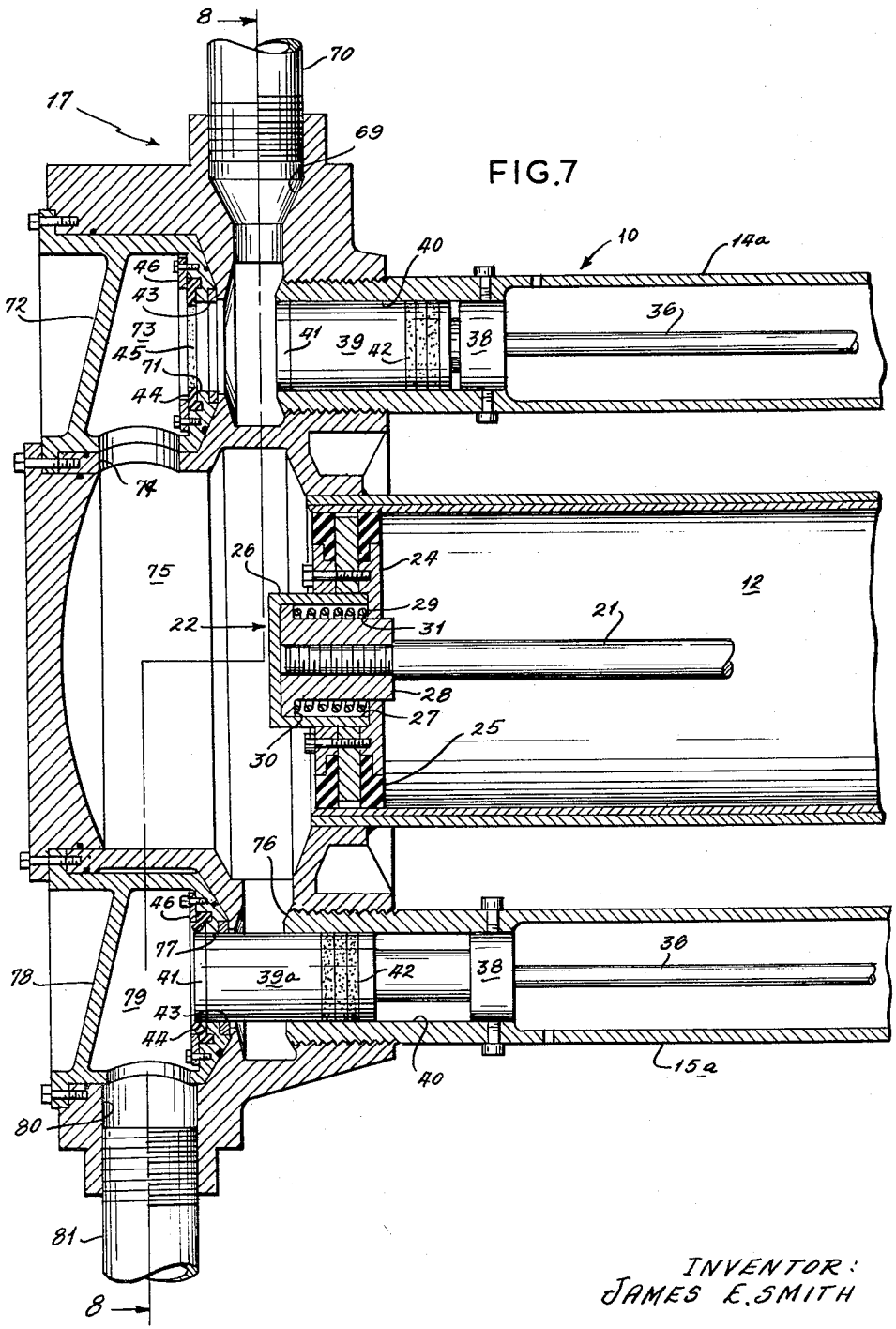
Figure 9:
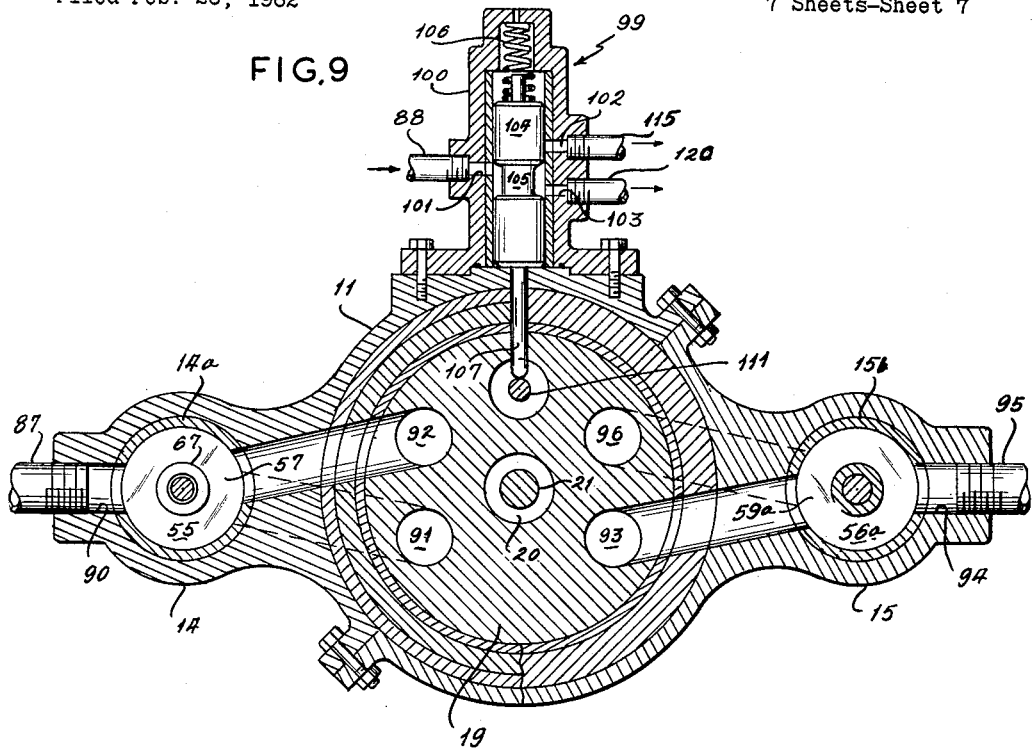
Figure 12:
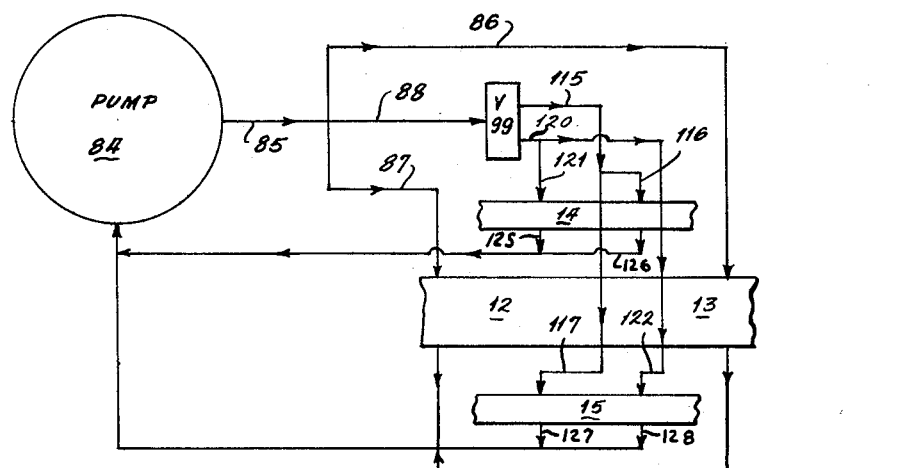

In the accompanying drawings which form part of this specification and wherein like numerals and symbols refer to like parts wherever they occur:

FIG. 1 is a top plan view of a hydraulic power converter embodying the present invention and showing the flow path of the pumped fluid in dotted lines with arrows thereon, FIG. 2 is an end view of the device, FIG. 3 is a longitudinal cross-sectional view taken along the line 3—3 of FIG. 2, FIG. 4 is an enlarged broken sectional view taken along line 4—4 of FIG. 5, FIG. 5 is an enlarged cross-sectional view taken along the line 5—5 of FIG. 4, FIG. 6 is an enlarged sectional view taken along line 6—6 of FIG. 5, FIG. 7 is an enlarged broken cross-sectional view of the end housing showing the left piston at its outermost position and showing the inlet and outlet valves for the pumped fluid, FIG. 8 is a sectional view taken along the line 8—8 of FIG. 7, FIG. 9 is an enlarged cross-sectional view taken along line 9—9 of FIG. 4, FIG. 10 is an enlarged broken sectional view showing the details of one of the valves controlling the flow of the pumped fluid in its open position, FIG. 11 is an enlarged broken sectional view of the valve shown in FIG. 10 in its closed position, and FIG. 12 is a diagrammatic representation of the flow path of the pumping fluid.

Referring now to the drawings in detail, it will be seen that the embodiment of the invention which has been illustrated comprises a hydraulic power converter 10 having a central portion 11 with two large aligned cylinders 12 and 13 therein, and two valve casings 14 and 15 parallel to said cylinders 12 and 13. The converter 10 is mounted on a base 16. End housings 17 and 18 are positioned on the outer ends of the cylinders 12 and 13 and also enclose the ends of the valve casings 14 and 15.

The central portion 11 is provided with a central housing 19 with the two relatively large cylinders 12 and 13 extending in opposite directions therefrom. The central housing 19 is provided with a bearing 20 for receiving a central shaft or piston rod 21 having flexible piston heads 22 and 23 mounted at both ends thereof. The central shaft 21 is slidable in said bearing 20. Each of the flexible piston heads 22 and 23 (FIG. 7) comprises an annular portion 24 with a seal 25 secured thereto in circumscribing relation. A hollow central cap 26 is secured to the annular portion 24 to form a chamber 27 for receiving a small piston 28 secured to the end of the central shaft 21 with a spring 29 therebetween. The spring 29 is positioned between a shoulder 30 in the small piston 28 and a shoulder 31 in the annular member 24. This arrangement allows some "play" between the central shaft 21 and the piston heads 22 and 23.

In other words, the shaft 21 and the small piston 28 can move longitudinally with respect to the annular portion 24 and the cap 26 by compressing the spring 29 between the shoulders 30 and 31. Similarly, the shaft 21 and the small piston 28 can remain stationary, while the annular portion 24 and the cap 26 are moving longitudinally by compressing the spring 29.

The two valve casings 14 and 15 are similar to each other and extend in parallel relation with the central cylinders 12 and 13 on either side thereof. The valve casings 14 and 15 comprise oppositely extending portions 14a, 14b, 15a and 15b on either side of the central portion 11 to provide a relatively long hollow cylindrical valve casing.

Although the inlet valve casing 14, the cylinders 12 and 13, and the outlet valve casing 15 are shown as being horizontally aligned, it is contemplated that they can be vertically aligned, i.e., the intake valve casing 14 can be positioned above the cylinders 12 and 13, and the outlet valve casing 15 can be positioned below the cylinders 12 and 13. This configuration is preferred when fluid containing heavy particles (such as ore or chat) is being transmitted, since gravity will assist in passing the heavy particles through the converter 10. Also, the inlet valve casing 14 can be below the cylinders 12 and 13, and the outlet valve casing 15 can be above the cylinders 12 and 13. This configuration is desired when particles lighter than the fluid (such as woodchips) are being transported, since the light particles will tend to float through the converter 10.

The valve casing 14 houses the intake control valve assembly 32 and the valve casing 15 houses the outlet or exhaust control valve assembly 33. Each of the valve assemblies 32 and 33 is provided with a main control piston portion 34 and 35, respectively, which is slidable longitudinally through the central portion 11 and has a valve rod 36 extending from each end thereof. Each of said valve rods 36 pass through fixed bushings 37 and 38 and has a valve head 39 or 39a on the leading end thereof. The valve heads 39 are part of the intake valve assembly 32, while the valve heads 39a are part of the exhaust valve assembly 33. Each valve head 39 or 39a is relatively long and slides on a machined surface 40 in the outer ends of the valve casings 14a, 14b, 15a and 15b.

Each of the valve heads 39 and 39a (FIGS. 10 and 11) is provided with a very hard steel insert plate 41 on the forward or cutting edge thereof and is provided with a suitable seal 42 around the outer periphery thereof. The steel insert plate 41 is in aligned relation with a very hard steel valve seat 43 mounted in the end housing 17. A seal member 44 having an annular opening 45 of less diameter than the steel insert plate 41 is positioned in the end housing 17 outwardly of the valve seat 43 and is adapted to seal the outer end of the valve head 39 after it has passed through the valve seat 43 against back pressure as will be explained more fully hereinafter (FIG. 11). The back pressure tends to force the seal 44 into tight compression around the outer periphery of the end of the plate 41. Since the seal 44 is positioned at the outer end of the stroke of the valve head 39, there is very little wear on the seal 44 caused by the back and forth movement of the valve head 39. A retaining plate 46 holds the outer seal 44 in place.

The main control portion 34 of the intake valve assembly 32 is similar to the main control portion 35 of the exhaust valve assembly 33, and therefore only the intake valve assembly control 34 will be described in detail. The valve assemblies 32 and 33 move in opposite directions simultaneously during functioning of the present invention.

The main control portion 34 of the intake valve assembly 32 (FIG. 4) includes a left piston comprising an annular plate 47 carrying a seal 48 on the outer periphery thereof and a stepped plug 49 secured to the outermost face thereof. The plate 47 and plug 49 define an effective piston surface in face-to-face relationship with the innermost fixed bushing 37. The plug 49 includes a projection 50 adapted to be received in a counterbore 51 in the bushing 37. The bushing inner surface includes a tapered surface 52 and a flat surface 53 connecting the counterbore 51 and the tapered surface 52. The piston surface and the bushing surface define an expandable annular chamber 54 with the inner surface of the valve casing 14a. The piston rod 36 extends from the projection 50 and rides in the bushing 37.

The center portion of the valve control 34 includes a pair of annular reduced sections 55 and 56 spaced by a solid core 57 carrying a seal 58.

The right-hand part of the inlet valve control 34 includes a right piston comprising an annular plate 59 carrying a seal 60 on the outer periphery thereof and a stepped plug 61 secured to the outer face thereof. The piston defines an effective piston surface in face-to-face relationship with the innermost fixed bushing 37. The plug 61 includes a projection 62 adapted to be received in a counterbore 63 in the bushing 37. The bushing inner surface includes a tapered surface 64 and a flat surface 65 connecting the counterbore 63 and the tapered surface 64. The piston surface and the bushing surface define an expandable annular chamber 66 with the inner surface of the valve casing 14b. The piston rod 36 extends from the projection 62 and rides in the bushing 37.

The entire main valve control portion 34 is a unitary assembly and moves leftwardly and rightwardly to carry the valve heads 39 into and out of the valve seats 43.

The effective pressure receiving area of the piston surface defined by the plate 47, the plug 49 and the projection 50 is greater than the effective pressure receiving area of the left-hand valve head end plate 41. Similarly, the effective pressure receiving area of the piston surface defined by the plate 59, the plug 61 and the projection 62 is greater than the effective pressure receiving area of the right-hand valve head end plate 41.

Thickened connecting rods 67 and 68 connect the core 57 with the annular plates 47 and 59 and the rods 67 and 68 are greater in diameter than the piston rods 36.

The left and right end housings 17 and 18, respectively, cover the ends of the cylinders 12 and 13 and the ends of the valve casings 14 and 15. The end housings 17 and 18 are similar and only the left end housing 17 will be described in detail.

As may be seen from FIGS. 3 and 7, the left end housing 17 is provided with an intake port 69 adapted to receive a conduit 70 carrying pumped fluid. The port 69 communicates with the intake valve casing 14a. The end housing 17 further defines an annular passage 71 wherein are located the valve seat 43 and the seal means 44.

A cover member 72 is secured to the end housing 17 and defines an intake chamber 73 which communicates with the annular passage 71. A passage 74 communicates the chamber 73 with a main end chamber 75 which is aligned with the left cylinder 12 and in communication therewith.

A connecting passage 76 communicates the main end chamber 75 and the left cylinder 12 with the exhaust valve casing 15a and with an annular passage 77 which is aligned with the valve casing 15a and houses the valve seat 43 and the seal 44.

A cover member 78 is secured to the end casing 17 and defines an outlet chamber 79 which communicates with the annular passage 77, when the exhaust valve 39a is open.

An outlet port 80 communicates with the outlet chamber 79 and is adapted to receive a conduit 81 for pumped fluid from the converter 10.

The pumped fluid containing the large chunks of abrasive material is picked up from its source through the conduit 70 when the intake valve head 39 is retracted and the intake port 69 is open. The fluid passes through the intake port 69, the annular passage 71, the end chamber 73, the passage 74 and is pulled into the main chamber 75 and the left cylinder 12 as the left piston 22 is moved rightwardly. When the cylinder 12 is full, the intake valve 39 closes and the exhaust valve 39a opens and, as the left piston 22 is moved leftwardly, the fluid is pumped out of the cylinder 12, through the end chamber 75, the passage 76, the annular passage 77, the outlet chamber 79 and the outlet port 80 to the conduit 81. The control for the piston 22 and the valves 39 and 39a will be described in more detail hereinafter.

The operation of the right-hand portion of the converter 10 is similar to that hereinbefore described for the left-hand portion, but is in an opposed sequence. In other words, when the left piston 22 is pushing or pumping fluid, the right piston 23 is on its intake stroke and pulling fluid into the cylinder 13. Also, when the left intake valve 39 is closed (during the pumping stroke), the right intake valve 39 is open. Similarly, when the left outlet valve 39a is open (during the outlet stroke), the right outlet valve 39a is closed.

As may be seen from FIG. 1, the pumped fluid is passed from its source through a main inlet conduit 82 which branches into the intake conduits 70 which connect to the converter pumped fluid intake ports 69. The branch converter outlet conduits 81 from the converter outlet ports 80 join into a main outlet conduit 83 for pumped fluid.

Therefore, the valve heads 39 and 39a operate against the flow of pumped fluid and the seal means 44 seals the back pressure of the pumped fluid. Also, the closed outlet valve head 39a (the left valve head 39a in FIG. 3) is sealed against the back pressure of the pumped fluid which acts on the closed valve head 39a through the branch conduit 81. Therefore, both of the closed valve heads 39 and 39a are sealed against the back pressure of the pumped fluid. The seal means 44 must have an annular opening 45 of less diameter than the diameter of the valve heads 39 and 39a to effectively seal against the outer periphery of the valve heads 39 and 39a as shown in FIG. 7 for the exhaust valve 39a.

The operation of the piston heads 22 and 23 and the valve heads 39 and 39a is controlled by a suitable system of openings, passages, conduits, and ports which are provided for the pumping fluid which is pumped in adequate quantities and pressure from a pump 84 which is capable of furnishing large quantities of pumped fluid under extremely high pressure. The pressure required of the pump 84 is determined by the density of the pumped fluid, the distance it must be moved, the pressure head desired, and the height it is raised. The flow diagram for the pumping fluid is diagrammatically shown in FIG. 12.

The discharge side of the pump 84 is connected to a main conduit 85 which branches into a three-way connection so that the pumped fluid is delivered simultaneously into three separate conduits 86, 87 and 88. The conduits 86 and 87 connect to ports 89 and 90 provided in the center portion 11 of the converter 10 (FIGS. 3 and 4). The ports 89 and 90 communicate with the intake valve casing 14 and are aligned with passages 91 and 92 which communicate with the cylinders 12 and 13, respectively.

The main control portion 34 of the intake valve assembly 32 is positioned so that it reciprocates the reduced portions 55 and 56 between the ports 89 and 90 and the passages 91 and 92 to alternately establish and interrupt communication between said ports 89 and 90 and the passages 91 and 92, respectively. Thus, when the intake valve 32 is in its rightward position (as shown in FIG. 3) the conduit 87 delivers pumping fluid from the pump 84 to the intake port 90 from whence it is passed by the reduced portion 55 to the passage 92 and into the right cylinder 13 where it urges the right piston 23 outwardly to pump the fluid in the cylinder 13 to the pumped fluid outlet conduit 81.

The exhaust valve 33 meanwhile is in its leftward position (FIG. 3) so that the fluid previously located in the left cylinder 12 behind the left piston 22 is exhausted through a passage 93 in the central portion 11 of the converter 10 around the reduced portion 56a of the exhaust piston control 35 through an outlet port 94 and to an exhaust conduit 95 which is connected to the intake side of the pump 84, thereby providing continuous closed circuit flow of the pumping fluid.

A passage 96 in the converter central portion 11 communicates the right cylinder 13 with the exhaust piston casing 15 and with an outlet port 97 which also is connected to an outlet conduit 98 and to the intake side of the pump 84, thereby providing a path for exhausting the pumping fluid from the right cylinder 13 behind the piston 23, when the piston 23 is moved leftwardly after the exhaust valve assembly 33 has been moved to its rightward position. When the exhaust valve assembly 33 is in its rightward position, the reduced portion 55a thereof communicates the port 97 with the passage 96.

Thus, it is seen that the pump 84 maintains a continuous pressure in the branch conduits 86 and 87 and that the movement of the control portions 34 and 35 of the valve assemblies 32 and 33 determines the path which is taken by the pumping fluid and therefore determines which of the cylinders 12 and 13 receives the pressurized fluid.

The position of the valve assemblies 32 and 33 determines the path of flow of the pumping fluid to the main cylinders 12 and 13 and thus determines the direction of movement of the pistons 22 and 23. However, the movement of the valve assemblies 32 and 33 themselves is controlled by a switching spool valve 99 which is responsive to movement of the piston heads 22 and 23 and is positioned on the outer surface of the central portion 11 and includes a cylinder 100 provided with an inlet port 101 and spaced outlet ports 102 and 103. A slidable piston 104 is positioned within the cylinder 100 and controls and switches the flow of fluid from the intake port 101 to the outlet ports 102 and 103. The piston 104 includes a reduced portion 105 in the center thereof and is urged downwardly against the outer surface of the central portion 11 by resilient means such as a spring 106 which is compressed between one end of the valve 99 and the upper end of the piston 104. A pin 107 is fixed to the lower end of the piston 104 and extends downwardly through the converter central portion 11 into a chamber 108 provided therein. The chamber 108 is open to the left cylinder 12. A pusher cam 109 is positioned within the chamber 108 and includes a main body portion 110 which is connected to a thin nose portion 111 by a tapered cam surface 112. A plug 113 is secured to the free end of the nose 110 and rides in a pocket 114 in the central portion 11, said pocket being open to the right cylinder 13. The cam member 109 is positioned within the cylinder 108 so as to protrude alternately beyond the outer surfaces of the converter central portion 11 into the cylinders 12 and 13.

The ends of the cam member 109 are engaged by the inner surface of the pistons 22 and 23 immediately prior to their engaging the inner surfaces of the central portion 11. When the piston which is moving in the cylinder which is being exhausted of pumping fluid engages the end of the cam 109 which is protruding into said cylinder, the cam member 109 is moved in the same direction as the piston is moving, and the rod 107 rides up or down the tapered surface 112 to move the spool piston 104 correspondingly, and thus switch the path of the pumping fluid between the outlet ports 102 and 103.

The spool valve inlet 101 is connected to the conduit 88 which delivers pumping fluid thereto.

As shown in FIGS. 1, 2 and 9, the uppermost control valve outlet port 102 is connected to a conduit 115 which branches into conduits 116 and 117 which are connected to inlet ports 118 and 119 which communicate with the annular chambers 66 and 54a in the valve casings 14 and 15, respectively. Similarly, the lowermost outlet port 103 is connected to a conduit 120 which branches into conduits 121 and 122 which connect to inlet ports 123 and 124 communicating with the annular chambers 54 and 66a in the valve casings 14 and 15, respectively.

The outlet conduits 125, 126, 127 and 128 from the annular chambers 54, 66, 54a and 66a are all connected to the intake side of the pump 84 and define a closed circuit for the pumping fluid.

Thus, it is seen that the flow of fluid to the valve casings is controlled by the movement of the main pumping pistons 22 and 23. However, once the flow of fluid to the valve assembly control portions 34 and 35 is reversed or switched by the movement of the control valve 99, the direction of flow of pumping fluid to the cylinders 12 and 13 is reversed, and thus the direction of travel of the pistons 22 and 23 also is reversed. The movement of the pistons 22 and 23 is relatively slow, being on the order of four to five reciprocating movements per minute, whereas the movement of the control valves 32 and 33 is relatively fast, so that the hard steel inserts 41 tend to cooperate with the valve seats 43 to cut or chop through any solid matter which may become lodged in the valve casings 14 and 15 and thereby prevent interruption of the flow of pumped fluid through the converter 10.

Also it is seen that momentarily there may be a flow of pumping fluid into both cylinders 12 and 13 during the time that the spool valve 99 is shifting. The resilient construction of the piston heads 22 and 23 prevents pulsation and interruption of flow of the pumping fluid and consequent interference with the pumping action of the pump 84. Also there may be a slower movement of the valve assemblies 32 and 33 during their initial phase of movement, since the pumping fluid is exerting a back pressure against the annular plates 47, 47a, 59 and 59a which must be overcome by the larger pressure receiving surfaces within the annular chambers 54, 54a, 66 and 66a. However, once the valve assemblies 32 and 33 begin to move to their new position, they move very rapidly to provide the intense cutting force which is necessary when particles of coal, etc. are being pumped and must be chopped through.

The flow of the pumped fluid is shown by the arrows and dotted lines in FIG. 1 wherein the abrasive containing fluid comes into the converter 10 from a single source at the upper left and upper right; is pumped by the pistons 22 and 23; leaves through the outlets at the lower left and lower right; and then is directed to a single pipe 83. Each of the cylinders 12 and 13 has an inlet valve 39 and an outlet valve 39a. During the intake stroke, the intake piston moves from its outermost position to its innermost position with the cylinder thereby taking in abrasive fluid through the open inlet valve 39. When the piston reaches its innermost position, it moves the pusher cam 109 and thereby reverses the flow of pumping fluid to the valve control ports so that the inlet valve 39 closes very rapidly and positively, since it chops or cuts its way through any foreign material that might otherwise tend to clog the closing of the inlet valve. Simultaneously therewith, the outlet valve 39a opens and the piston begins its reverse stroke and moves toward the outer end of its cylinder, due to the pressure of the fluid from the operating pump, thereby forcing the abrasive fluid out through outlet valve 39a in large quantity under high pressure.

To recapitulate a complete cycle of the flexible piston heads 22 and 23, i.e., a complete leftward and rightward movement, I start with the left piston 22 in its leftmost or outermost position (as shown in FIG. 7). In this position, the right piston 23 engages the plug 113 and moves the pusher cam 109 to its left position (FIG. 6) and the spool valve 99 drops to its lowermost position to connect the inlet 101 to the lower outlet 103 whereby pumping fluid is passed to the conduits 121 and 122 and through the ports 123 and 124 into the valve casing chambers 54 and 66a. The inlet valve assembly 32 moves to its rightward position (FIG. 3) because of the flow of pumping fluid into the valve casing chamber 54 and opens the left inlet port 69 for pumped fluid and closes the right pumped fluid inlet port 69a. The rightward movement of the inlet valve 32 also establishes communication between the pumping fluid inlet port 90 and the right cylinder 13 through the passage 92 and the reduced portion 55 of the inlet valve control portion 34. The rightward movement of the inlet valve 32 also interrupts communication between the pumping fluid conduit 86 and the left cylinder 12 by positioning the core 57 between the inlet port 89 and the passage 91. The flow of pumping fluid into the right cylinder 13 behind the piston head 23 tends to move the right piston 23 outwardly toward its rightward position immediately subsequent to the movement of said intake valve assembly 32. Thus, the inlet valve assembly 32 moves in the same direction and immediately before the subsequent movement of the piston heads 22 and 23.

Simultaneously with the rightward movement of the intake valve 32, the outlet valve assembly 33 moves leftwardly (FIG. 3), since the pumping fluid in the conduit 122 is passed to the valve casing chamber 66a and the conduit 117 is cut off from the valve casing chamber 54a. The leftward movement of the exhaust valve 33 closes the left outlet pumped fluid port 80 and opens the right outlet pumped fluid port 80a. The leftward movement of the valve 33 also establishes communication between the left cylinder 12 and the pumping fluid outlet conduit 95 by positioning the reduced portion 56a between the passage 93 and the port 94. Communication between the right cylinder 13 and the outlet conduit 98 is interrupted, since the core 57a is positioned between the passage 96 and the port 97. The rightward movement of the left piston 22 forces pumping fluid from the left cylinder 12 through the passage 93 into the outlet conduit 95 and to the intake side of the pump 84. Thus, the exhaust piston assembly 33 moves immediately before and in the opposite direction from the pistons 22 and 23.

The foregoing described condition holds during the rightward movement of the pistons 22 and 23 (FIG. 3).

When the left piston 22 reaches its innermost or rightward position (indicated by the broken lines in FIG. 3), it engages the body 110 of the pusher cam 109 and moves the pusher cam 109 rightwardly, raising the spool piston 104 to establish pumping fluid flow through the inlet port 101 to the uppermost outlet 102 and to the conduits 116 and 117. Accordingly, the fluid is passed to the valve casing chambers 66 and 54a and is shut off from the valve casing chambers 54 and 66a. Thus, the inlet valve 32 moves leftwardly, and the outlet valve 33 moves rightwardly. Simultaneously, the flow of pumping fluid is cut off from the right cylinder 13 and is passed to the left cylinder 12 thereby moving the left piston 22 leftwardly to push the pumped fluid out of the left chamber 12 to the discharge conduit 83. The right piston 23 also is moved leftwardly and pulls pumped fluid into the right cylinder 13. Also, the flow paths for the pumping fluid from the cylinders 12 and 13 to the outlet conduits 95 and 98 are reversed by the leftward movement of the outlet valve 33. Communication is established between the right cylinder 13 and the conduit 98 to exhaust pumping fluid from the right cylinder 13 to the intake side of the pump 84; and communication is interrupted between the left cylinder 12 and its discharge conduit 95.

The foregoing cycle is repeated as the converter 10 is operated.

Any adequate source of pressurized fluid, the fluid preferably being oil or a mixture of oil and water, can be used to supply sufficient pumping fluid to the central portion of the present hydraulic power converter 10. This converter 10 does not pump by itself but requires a source of pressurized fluid, such as the pump 84, in order for it to perform its operation.

By using the converter 10, large quantities of abrasive material are pumped in large cylinders with slow moving piston heads, thereby reducing wear. This arrangement further requires only a few movements of the inlet and outlet valves per minute thereby reducing wear, as compared to a conventional pump wherein small chambers are used with rapidly moving pistons and valves. The present piston heads are flexible to permit some give to prevent pulsation and the interruption of flow. The inlet and outlet valves are specifically designed to prevent wear and clogging.

Thus, it is seen that the present invention provides a hydraulic power converter for pumping large quantities of abrasive fluids at high pressures which achieves all of the objectives and advantages sought therefor.

This invention is intended to cover all changes and modifications of the examples of the invention herein chosen for purposes of the disclosure which do not constitute departures from the spirit and scope of the invention.

What I claim is:

1. A hydraulic power converter comprising a central portion, a pair of cylinders extending therefrom, a main piston rod, piston heads flexibly positioned on the ends of said main piston rod for limited longitudinal movement with respect to said main piston rod, said piston heads being positioned in said cylinders, said piston rod being slidable through said central portion, inlet valves for controlling flow of fluid to each of said cylinders, outlet valves for controlling flow of fluid from each of said cylinders, and means for rapidly opening and closing said inlet and outlet valves in response to movement of said piston heads in said cylinders.

2. The hydraulic power converter defined in claim 1 wherein said inlet and outlet valves comprise slidable heads and cooperating seats spaced from said heads to define ports therebetween, said heads adapted to move into said seats to close said ports.

3. The hydraulic power converter defined in claim 2 including seal means positioned at said valve seat, said seal means having annular openings adapted to receive said piston heads and to seal said ports against the back pressure of the fluid from said cylinders against the forward ends of said piston heads.

4. The hydraulic power converter defined in claim 1 wherein said inlet and outlet valves comprise longitudinally movable piston rods, slidable plunger valve heads carried on the ends of said rods, and control portions between said heads, the control portions of said valves including pressure receiving faces of greater effective area than the end faces of said valve heads.

5. The hydraulic power converter defined in claim 1 wherein said flexible connection between said piston heads and said main piston rod includes an annular plate defining an internal shoulder, a seal circumscribed about said plate, an internal shoulder on the end of said piston rod aligned with said plate internal shoulder, resilient means trapped between said shoulders, and means for retaining said plate on said piston rod.

6. A hydraulic power converter comprising a central portion, said central portion having passages therein communicating inlet and exhaust ports with a pair of cylinders extending outwardly from said central portion, a main piston rod slidable through said central portion in said cylinders, piston heads flexibly mounted on the ends of said rod for limited longitudinal movement with respect to said rod, each of said heads also being longitudinally movable with said main piston rod in one of said cylinders, an inlet valve casing extending from said central portion along said cylinders, a valve rod movable through said inlet valve casing, inlet valve heads mounted on the ends of said valve rod, said valve heads being adapted to control flow of pumped fluid to said cylinders, an exhaust valve casing extending from said central portion along said cylinders, a valve rod movable through said exhaust valve casing, exhaust valve heads mounted on the ends of said valve rod, said valve heads being adapted to control flow of pumped fluid from said cylinders, and means for longitudinally moving said valve rods through said valve casings to establish and interrupt flow of pumped fluid to and from said cylinders in response to movement of said pistons in said cylinders.

7. A hydraulic power converter comprising a central portion, spaced end portions, a pair of aligned relatively large central cylinders, a main shaft mounted in said central portion and movable therethrough, said shaft extending into said central cylinders, piston heads mounted on the end of said shaft, one piston head being in each of said central cylinders, said pistons being mounted on said shaft with a predetermined limited movement therebetween, valve casings on either side of said central cylinders, said valve casings each having central portions with a valve rod therethrough, valve heads mounted on the ends of said valve rods, valve seats mounted in said connecter end portions, there being an inlet valve and outlet valve in each converter end, said valves controlling the flow of fluid to and from said central cylinders, means for simultaneously moving said valve rods in opposite directions into and out of said valve seats to open and close said intake and outlet valves, means for moving said main piston shaft and said piston heads immediately subsequent to the movement of said intake valve rod to force fluid from said cylinders through the open outlet valve and pull fluid into said other cylinder through the open intake valve.

8. The hydraulic power converter defined in claim 7 wherein said valve heads have hardened ends and said valve seats have hardened inner surfaces through which said valve head ends move during closing.

9. The hydraulic power converter defined in claim 8 including a seal means positioned outwardly of said valve seat, said seal means having an annular opening of less diameter than said valve head and being compressed against said valve head and sealing against the back pressure of said cylinder fluid when said valve is closed.

10. The hydraulic power converter defined in claim 8 wherein said means for moving said valve rods and said main shaft and piston heads includes control portions fastened to said valve rods between said valve heads, each of said control portions having opposed pressure receiving faces of greater effective area than said valve heads whereby pressure exerted on one of said faces drives said valve rod in the same direction, said control portions having a pair of spaced reduced areas adapted to be alternately aligned with one of a pair of passages provided in said converter control portion, each of said passages communicating with one of said cylinders and adapted to be connected to a source of pressurized fluid.

11. The structure defined in claim 8 wherein said piston heads comprise an annular plate having an internal shoulder and being slidable along said shaft, a seal positioned around the outer periphery of said plate, an internal shoulder on said shaft positioned outwardly from said shoulder on said plate, a spring trapped between said shoulders, and means for retaining said plate movably on said shaft.

12. A hydraulic power converter comprising a central portion provided with fluid passages, aligned main cylinders extending in opposed directions from said central portion and communicating with said central portion passages, a main piston shaft positioned in said central portion and said main cylinders and being longitudinally movable, a pair of pistons mounted on the ends of said piston rod, one of said pistons being positioned within and movable through each of said cylinders, said piston being mounted on said piston rods so that predetermined limited movement exists therebetween, said pistons comprising an annular plate defining an internal shoulder, a hollow closed end cap secured to said plate and enclosing the end of said piston rod, a seal circumscribed about said plate and riding on the interior surface of said cylinder, an internal shoulder on said rod in opposed relation to the plate shoulder, and resilient means interposed between said shoulders, an inlet valve assembly including an inlet valve casing fixed to said central portion and extending from each side thereof along said cylinders, a movable valve rod slidable longitudinally through said casing in bushings fixed therein, a control portion slidable with said valve rod, valve heads carried on the ends of said valve rod, and hardened inserts on said valve heads, said control portion being provided with spaced reduced portions adapted to establish and interrupt fluid flow through the converter central portion fluid passages as said valve rod is moved through said valve casing, the end faces of said control portion defining an expandable fluid pressure receiving chamber with the inner faces of a pair of said fixed bushings, the effective pressure receiving areas of said control portion end faces being greater than the effective end areas of said valve heads, an outlet valve assembly including an inlet valve casing fixed to said central portion and extending from each side thereof along said cylinders, a movable valve rod slidable longitudinally through said casing in bushings fixed therein, a control portion slidable with said valve rod, valve heads carried on the ends of said valve rod, and hardened inserts on said valve heads, said control portion being provided with spaced reduced portions adapted to establish and interrupt fluid flow through the converter central portion fluid passages as said valve rod is moved through said valve casing, the end faces of said control portion defining an expandable fluid pressure receiving chamber with the inner faces of a pair of said fixed bushings, the effective pressure receiving areas of said control portion end faces being greater than the effective end areas of said valve heads, a pair of end housings, each of which encloses the free end of one of each of said cylinders, said inlet casings and said outlet casings, said end housings defining fluid inlet and outlet ports which communicate with said cylinders and which are adapted to be opened and closed by movement of said inlet and outlet valve heads, hardened valve seats positioned in said end housings in alignment with said valve heads, seal means positioned in said end housings outwardly of said valve seats adapted to seal said valve heads against back pressure in said end housing, and a control system for moving said valve heads and said piston heads including a pair of conduits adapted to be alternately connected to a source of pressurized fluid, each of said conduits communicating with one of the inlet valve pressure receiving chambers and one of the outlet valve pressure receiving chambers, said chambers being on opposite sides of the converter central portion whereby the inlet valve assembly and the outlet valve assembly move in opposite directions when either of said conduits is connected to a source of pressurized fluid, thereby opening the inlet port in one end housing and closing the inlet port in the other end housing, thereby also closing the outlet port in said one end housing and opening the inlet port in said other end housing, a first pair of inlet ports adapted to be connected to a source of pressurized fluid, said ports being connected to fluid passages in said converter central portion and adapted to pass pressurized fluid to said cylinders behind said piston heads when communication is established between said passages and said cylinders through said inlet valve assembly control portion, a second pair of outlet ports connected to fluid passages in converter central portion and adapted to pass pumping fluid from behind the piston which is on its intake stroke, flow of pumping fluid through said ports being controlled by movement of the control portion of said exhaust valve assembly, and means responsive to movement of said piston heads into close proximity of said converter central portion to switch the flow of pressurized fluid between said pair of conduits, thereby moving said inlet valve assembly in the direction of potential movement of said piston heads and moving said outlet valve assembly in the opposite direction, thereby opening the outlet port in the end housing toward which the piston heads are moving.

13. A system for pumping abrasive fluids under pressure comprising a high pressure pump having a discharge and inlet side, a hydraulic fluid converter defined in claim 6, conduit means connecting the discharge side of said pump to the inlet ports of said converter central portion, means for switching the discharge flow of pumping fluid between spaced inlet ports of said converter valve assemblies in response to movement of said main piston heads, and conduit means also connecting the discharge side of said pump to said pumping fluid switching means.

14. A system for pumping abrasive fluids under pressure comprising a high pressure pump having a discharge and inlet side, a hydraulic fluid converter defined in claim 10, conduit means connecting the discharge side of said pump to the inlet passages in said converter central portion, means for switching the pump discharge flow of pumping fluid between spaced inlet ports communicating with the opposed faces of said control portions of said converter valve assemblies in response to movement of said main piston heads, conduit means also connecting the discharge side of said pump to said pumping fluid switching means, and return conduits from said converter central portion and said valve assemblies to the inlet side of said pump for the continuous closed cycling of the pumping fluid.

15. A system for pumping abrasive fluids under pressure comprising a high pressure pump having a discharge and inlet side, a hydraulic fluid converter defined in claim 12, conduit means connecting the discharge side of said pump to the first named pair of ports of said converter central portion, conduit means connecting the discharge side of said pump to said pumping fluid switching means, and return conduit means connecting the second named pair of ports in said converter central portion on said inlet and outlet valve pressure receiving chambers to the intake side of said pump, thereby defining a continuous closed cycle for said pumping fluid.

References Cited in the file of this patent

UNITED STATES PATENTS

| | | |
|---|---|---|
| 421,159 | Brown | Feb. 11, 1890 |
| 1,152,112 | Lucas | Aug. 31, 1915 |
| 1,161,787 | Nickol | Nov. 23, 1915 |
| 1,437,704 | Barrance | Dec. 5, 1922 |
| 1,591,693 | Atz | July 6, 1926 |
| 1,757,271 | Surber | May 6, 1930 |
| 1,798,123 | Murray | Mar. 24, 1931 |
| 2,019,786 | Jurs | Nov. 5, 1935 |
| 2,349,150 | Falasconi | May 16, 1944 |
| 2,476,378 | Majneri | July 17, 1949 |
| 2,792,785 | Hayden | May 21, 1957 |